March 31, 1964  G. E. BOCK  3,127,142
RETRACTABLE STANCHION
Filed March 10, 1961  2 Sheets-Sheet 1
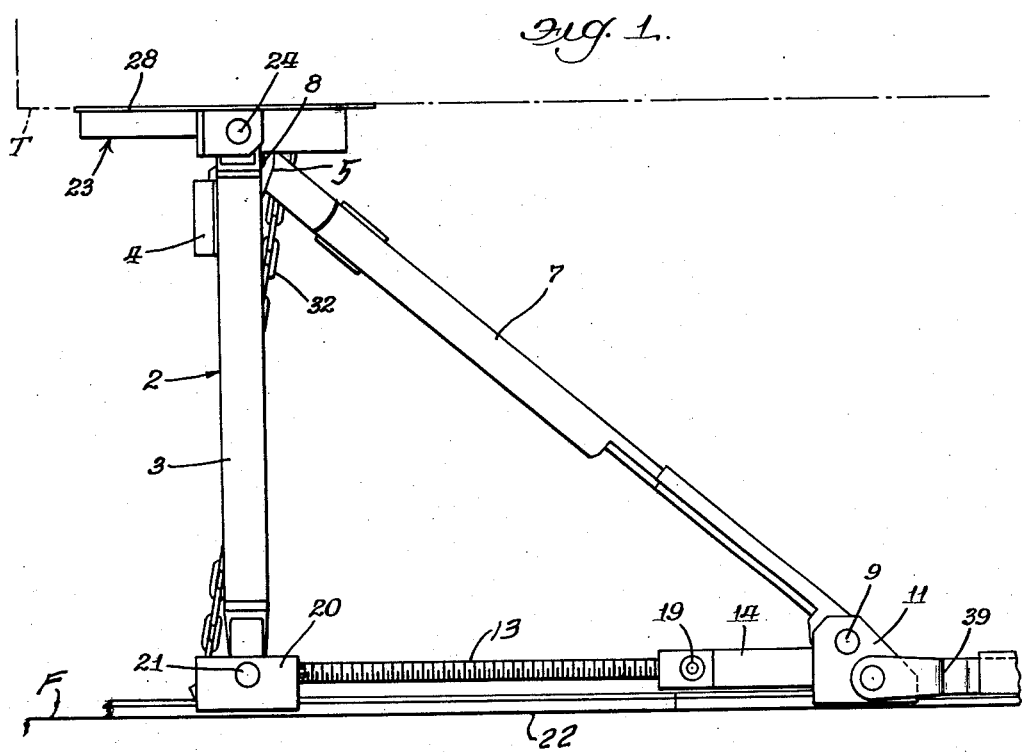
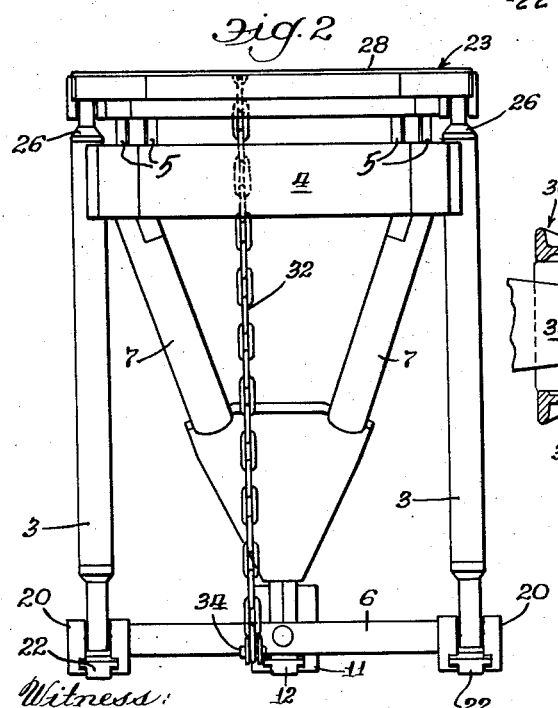
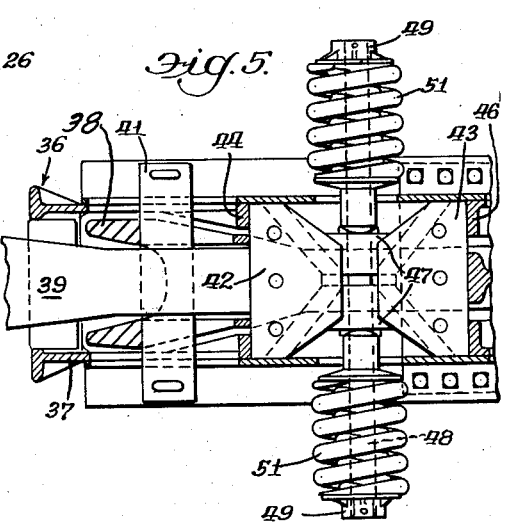
INVENTOR.
George E. Bock
BY Walter S. Schlegel, Jr.
Atty.
Witness:
Charles H. Bassett March 31, 1964  G. E. BOCK  3,127,142
RETRACTABLE STANCHION
Filed March 10, 1961  2 Sheets-Sheet 2
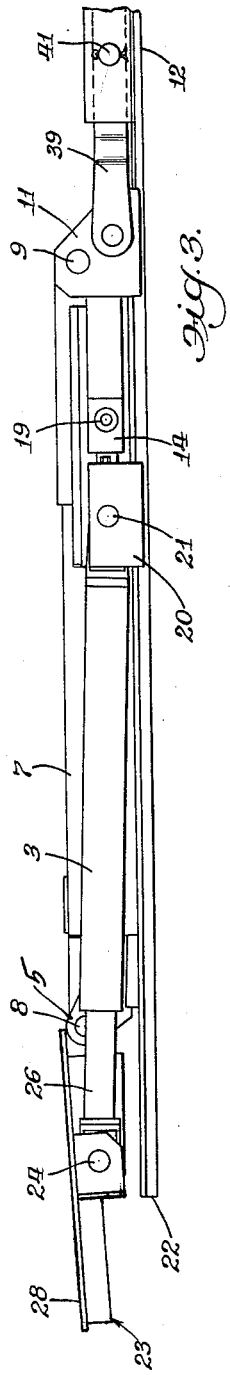
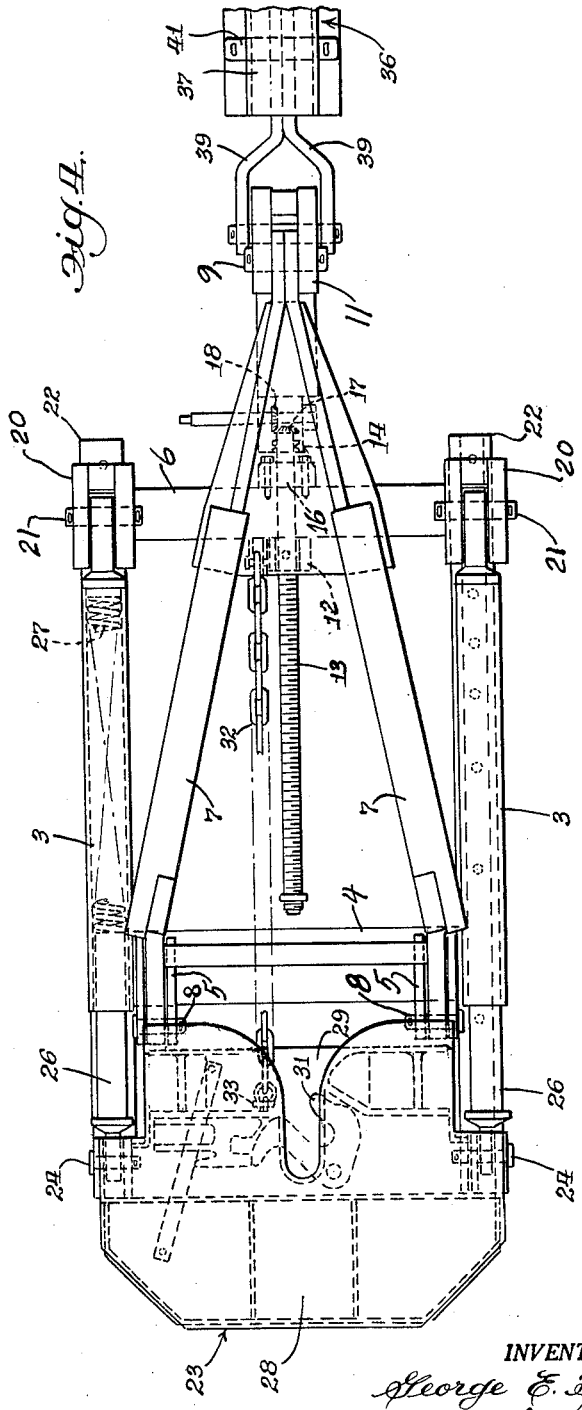
INVENTOR.
George E. Bock
BY Walter L. Schlegel, Jr.
Atty.

3,127,142
RETRACTABLE STANCHION

George E. Bock, Munster, Ind., assignor to Amsted Industries Incorporated, Chicago, Ill., a corporation of New Jersey Filed Mar. 10, 1961, Ser. No. 94,899
5 Claims. (Cl. 248—119)

This invention relates to railway cars for transporting vehicles and, more particularly, to means for detachably securing a trailer to a railway flat car.

While various types of fastening means have heretofore been provided for securing trailers to railway flat cars, some types of fastening means are too expensive to manufacture and install on railway flat cars, other types require the services of several men to secure a trailer to a flat car, and some types are not provided with cushioning means to protect a trailer and its contents against impacts.

It is, therefore, an object of the invention to provide a railway flat car with a trailer fastening means which is relatively simple in operation, inexpensive in construction, and reliable in use.

Another object of the invention resides in the provision of a retractable stanchion comprising a fifth wheel assembly mounted for pivotal movement on the upper end of a rigid triangular structure, said assembly being pivoted from a substantially vertical plane toward a substantially horizontal plane responsive to erection of the stanchion and engagement of the assembly with a trailer king pin.

A further object of the invention resides in the provision of a retractable stanchion structure in which the energy of longitudinal impacts is absorbed by a cushioning device to protect the trailer and any goods contained therein against damage in transit.

Another object of the invention resides in the provision of a retractable stanchion adapted to occupy a minimum amount of space in its retracted or collapsed position.

Another object of the invention resides in the provision of a retractable stanchion comprising, in its erected position, a rigid triangular structure slidably mounted on rails secured to a flat car and engaged by a cushioning device to effectively absorb the energy of longitudinal impact forces during transport of a trailer.

The invention embodies other novel features, details of construction and arrangement of parts which are hereinafter set forth in the specification and claims and illustrated in the accompanying drawings, forming part thereof, wherein:

FIGURE 1 is a side elevation illustrating a retractable stanchion embodying features of the invention, the stanchion being shown in its erected position;

FIGURE 2 is an end elevation of same;

FIGURE 3 is a side elevation showing the stanchion in its retracted position;

FIGURE 4 is a plan view of the retracted stanchion; and

FIGURE 5 is a fragmentary section illustrating the cushioning device.

Referring now to the drawings for a better understanding of the invention, the retractable stanchion is shown as comprising, in erected position, a rigid triangular structure indicated generally at 2. The structure 2 comprises a pair of vertical legs 3—3 interconnected at their upper ends by a cross member 4 and interconnected at their lower ends by a shoe beam 6. The upper end of a diagonal leg 7 is pivotally connected at 8 to lugs 5 on cross beam 4. The lower end of the diagonal leg 7 is pivotally connected at 9 to a shoe 11 slidably mounted on a center rail 12. A screw 13 is journaled at one end of shoe 11 in a bearing block 14 for rotational and nonaxial movement, the other end of the screw being in threaded engagement with a nut 16 secured on the shoe beam 6. A bevel gear 17 is secured on the end of the screw 13 for meshing engagement with a driving bevel gear 18 secured on a shaft 19 journaled in the bearing block 14.

The shoe beam 6 is provided with shoes 20—20 which are pivotally connected at 21—21 to the lower end of the vertical members 3—3, the shoes being slidably mounted upon side rails 22—22. The center rail 12 and the side rails 22—22 are adapted to be secured to the floor F of a conventional railway flat car by means of bolts or screws.

A fifth wheel assembly, indicated generally at 23, is pivotally mounted at 24—24 on the upper ends of supporting pins 26—26 slidably mounted in the tubular vertical legs 3—3. Helical compression springs 27—27 are mounted within their respective vertical legs 3—3 to yieldably resist downward movement of the supporting pins 26—26 into the legs 3—3.

The fifth wheel assembly 23 comprises a top plate 28 formed with a recess 29 to receive the neck portion of a trailer king pin. The assembly 23 is provided with a conventional lock mechanism 31 to engage the trailer king pin against movement out of the recess or slot 29. The lock mechanism 31 forms no part of the present invention and may be of the type shown and described in Patent No. 2,861,818, issued to Kayler, Kulieke, and Greenawalt, which patent is incorporated herein by reference.

One end of a chain 32 is connected at 33 to the slotted end of the fifth wheel assembly, the other end of the chain being connected at 34 to the shoe beam 6. When the stanchion is in its retracted position, the chain 32 coacts with the springs 27—27 to hold the slotted end of the top plate 28 against the lugs 5, as shown in FIGURES 3 and 4. During erection of the stanchion, the slotted end of the plate 28 is held in engagement against the lugs 5 and substantially parallel to the diagonal leg 7.

Movement of the triangular structure 2 is yieldably resisted by a cushioning device, indicated generally at 36. The cushioning device 36 is shown as comprising a housing 37 adapted to be secured to the floor of a railway flat car by means of bolts or screws. A yoke 38 is secured to the shoe 11 by means of links 39—39 and a key 41. Wedge shaped front and rear followers 42 and 43, respectively, are mounted within a transverse opening in the yoke and normally are engaged against stops 44 and 46, respectively, provided on the housing 37. Side wedges 47—47 are interposed between the followers 42 and 43, the followers being interconnected by a spring shaft 48 extending therethrough transversely of the housing 37. End plates 49—49 are secured to opposite ends of the spring shaft 48 to form seats for the outer ends of helical compression springs 51—51, the springs 51 acting to yieldably resist movement of the side wedges 47—47 away from each other.

To detachably secure a highway trailer T to a railway flat car, the triangular structure 2 provided to support the fifth wheel assembly 23 is first disposed in its collapsed or retracted position as illustrated in FIGURE 3. A trailer is moved into position on the flat car above the stanchion and then disconnected from its tractor while the front end of the trailer is supported upon its landing gear. The stanchion is then raised from its collapsed position toward its erected position by rotating the driving shaft 19. It will be understood that either manual or power means can be provided to turn the shaft 19 to raise or lower the stanchion. During upward pivotal movement of the legs 3—3 the fifth wheel assembly 23 is maintained in a plane substantially parallel to the plane of the leg 7. When the upper end of the fifth wheel assembly engages the bottom of the trailer body, the assembly is pivoted in a counterclockwise direction, as shown in FIGURE 1, and causes the supporting pins 26—26 to move downwardly into the legs 3—3 and compress the springs 27—27 therein. As the legs 3—3 approach their vertical position the fifth wheel assembly 23 slides along the bottom side of the trailer and moves into locking engagement with the king pin thereon.

During transportation of the trailer upon the flat car, longitudinal impacts are transmitted from the triangular structure to the cushioning device 36 to cause one of the followers 42 or 43 to move the side wedges 47—47 away from each other against the force exerted by the springs 51—51.

When the fifth wheel assembly is coupled to the neck portion of the trailer king pin, it will be noted that the chain 32 serves to secure the front end of the trailer against upward movement relative to the floor F of the railway car.

I claim:

1. In a retractable stanchion, a pair of vertical legs, a cross beam connecting the upper ends of said legs, a shoe beam, side shoes fixed on said shoe beam and pivotally connected to the lower ends of their respective vertical legs, side rails slidably engaging said shoes, a diagonal leg having an upper end pivotally connected to said cross beam, a center shoe pivotally connected to the lower end of said diagonal leg, a center rail slidably engaging said center shoe, a screw interconnecting said center shoe and said shoe beam, and a fifth wheel assembly mounted on said vertical legs.

2. In a retractable stanchion, a pair of vertical legs, a cross beam connecting the upper ends of said legs, a shoe beam, side shoes on said shoe beam pivotally connected to the lower ends of their respective vertical legs, side rails slidably engaging said shoes, a diagonal leg having one end pivotally connected to said cross beam, a center shoe pivotally connected to the other end of said diagonal leg, a center rail slidably engaging said center shoe, a screw interconnecting said center shoe and said shoe beam, a fifth wheel assembly mounted on said vertical legs, and a friction cushioning device secured to said center shoe to yieldably resist movement of said stanchion along said rails.

3. In a retractable stanchion, a pair of vertical legs, a cross beam connecting the upper ends of said legs, a shoe beam, side shoes on said shoe beam pivotally connected to the lower ends of their respective vertical legs, side rails slidably engaging said shoes, a diagonal leg having one end pivotally connected to said cross beam, a center shoe pivotally connected to the other end of said diagonal leg, a center rail slidably engaging said center shoe, a screw interconnecting said center shoe and said shoe beam, a fifth wheel assembly, and means on said vertical legs to support said assembly for vertical and pivotal movement.

4. In a retractable stanchion, a pair of vertical legs, a cross beam connecting the upper ends of said legs, a shoe beam, side shoes on said shoe beam pivotally connected to the lower ends of their respective vertical legs, side rails slidably engaging said shoes, a diagonal leg having one end pivotally connected to said cross beam, a center shoe pivotally connected to the other end of said diagonal leg, a center rail slidably engaging said center shoe, a screw interconnecting said center shoe and said shoe beam, a fifth wheel assembly, means on said vertical legs to support said assembly for vertical and pivotal movement, and resilient means interposed between said assembly support means and said vertical legs.

5. In a retractable stanchion, a pair of vertical legs, a cross beam connecting the upper ends of said legs, a shoe beam, side shoes on said shoe beam pivotally connected to the lower ends of their respective vertical legs, side rails slidably engaging said shoes, a diagonal leg having one end pivotally connected to said cross beam, a center shoe pivotally connected to the other end of said diagonal leg, a center rail slidably engaging said center shoe, a screw interconnecting said center shoe and said shoe beam, a fifth wheel assembly, means on said vertical legs to support said assembly for vertical and pivotal movement, resilient means interposed between said assembly support means and said vertical legs, and a chain interconnecting said assembly and said shoe beam.

References Cited in the file of this patent

UNITED STATES PATENTS

| | | |
|---|---|---|
| 2,936,983 | Markestein | May 17, 1960 |
| 2,967,492 | Keener | Jan. 10, 1961 |
| 2,971,478 | Dilworth | Feb. 14, 1961 |
| 3,041,028 | McDowell | June 26, 1962 |

FOREIGN PATENTS

| | | |
|---|---|---|
| 830,410 | Great Britain | Mar. 16, 1960 |